United States Patent
Nakamura et al.

(10) Patent No.: US 9,262,352 B2
(45) Date of Patent: Feb. 16, 2016

(54) ACCESS DEVICE, COMMUNICATION DEVICE, COMMUNICATION SYSTEM, AND DATA ACCESS METHOD

(71) Applicant: Panasonic Corporation, Osaka (JO)

(72) Inventors: Masahiro Nakamura, Hyogo (JP); Takuji Maeda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 463 days.

(21) Appl. No.: 13/928,620

(22) Filed: Jun. 27, 2013

(65) Prior Publication Data

US 2013/0290586 A1 Oct. 31, 2013

Related U.S. Application Data

(63) Continuation-in-part of application No. PCT/JP2012/003480, filed on May 28, 2012.

(30) Foreign Application Priority Data

Feb. 27, 2012 (JP) ................................. 2012-039609

(51) Int. Cl.
*G06F 13/24* (2006.01)
*G06F 21/60* (2013.01)
(Continued)

(52) U.S. Cl.
CPC .............. *G06F 13/24* (2013.01); *G06F 21/604* (2013.01); *G06F 21/6218* (2013.01); *G06F 3/0637* (2013.01)

(58) Field of Classification Search
CPC ... G06F 13/24; G06F 21/6218; G06F 21/604; G06F 3/0637
See application file for complete search history.

(56) References Cited

U.S. PATENT DOCUMENTS 5,845,061 A 12/1998 Miyamoto et al.
6,105,122 A 8/2000 Muller et al.
(Continued)

FOREIGN PATENT DOCUMENTS

EP  0 935 201 A1  8/1999
EP  1 607 872 A1  12/2005
(Continued)

OTHER PUBLICATIONS

International Search Report for corresponding International Application No. PCT/JP2012/003480, dated Jul. 31, 2012 (English Translation).
WiGig White Paper, "Defining the Future of Multi-Gigabit Wireless Communications", Wireless Gigabit Alliance, Jul. 2010, p. 1-5, <url:http://wirelessgigabitalliance.org/>.
(Continued)

*Primary Examiner* — Glenn A Auve
(74) *Attorney, Agent, or Firm* — Renner, Otto, Boisselle & Sklar, LLP

(57) ABSTRACT

The access device comprises a memory and a device controller configured to send and receive a data control right between the data recording device and a central controller provided in a host device. When having received a request to interrupt transfer of data from the central controller while data is being transferred from the data recording device, the device controller releases the data control right from the data recording device, and has the data recording device determine whether or not mismatching has occurred in file system management information for data stored in the memory. The device controller then returns the data control right to the data recoding device when it is determined that mismatching has occurred in the file system management information. The data recording device releases the data control right after eliminating the mismatching in the file system management information according to the returned data control right.

15 Claims, 7 Drawing Sheets

(51) Int. Cl.
*G06F 21/62* (2013.01)
*G06F 3/06* (2006.01)

(56) References Cited

U.S. PATENT DOCUMENTS

| | | |
|---|---|---|
| 7,512,759 B2 | 3/2009 | Nakanishi et al. |
| 2004/0236876 A1 | 11/2004 | Kondratiev et al. |
| 2005/0234858 A1* | 10/2005 | Torii .................... G11B 27/034 |
| 2005/0246612 A1 | 11/2005 | Leis et al. |
| 2006/0050622 A1 | 3/2006 | So et al. |
| 2006/0200864 A1 | 9/2006 | Nakanishi et al. |
| 2007/0043903 A1 | 2/2007 | Utsumi |
| 2008/0154974 A1* | 6/2008 | Obata ................. G06F 11/1435 |
| 2012/0265839 A1* | 10/2012 | Ohta ..................... G06F 3/0613 709/212 |
| 2013/0073781 A1* | 3/2013 | Maeda ............. G06F 17/30123 711/102 |
| 2013/0232314 A1* | 9/2013 | Goto .................. G06F 12/0815 711/163 |

FOREIGN PATENT DOCUMENTS

| | | |
|---|---|---|
| JP | 08-153014 A | 6/1996 |
| JP | 08-212095 A | 8/1996 |
| JP | 2001-306296 | 11/2001 |
| WO | WO 2012/001908 A1 | 1/2012 |

OTHER PUBLICATIONS

International Search Report for corresponding International Application No. PCT/JP2012/003480 mailed Jul. 31, 2012.

Form PCT/ISA/237 for corresponding International Application No. PCT/JP2012/003480 dated Jul. 31, 2012.

International Preliminary Report on Patentability for corresponding International Application No. PCT/JP2012/003480 dated Dec. 6, 2012.

Extended European Search Report for corresponding European Application No. EP 12 85 6580 dated Feb. 17, 2015.

* cited by examiner

ACCESS DEVICE, COMMUNICATION DEVICE, COMMUNICATION SYSTEM, AND DATA ACCESS METHOD

CROSS-REFERENCE TO RELATED APPLICATIONS

This application is a continuation of PCT Application No. PCT/JP2012/003480 filed on May 28, 2012 which claims priority to Japanese Patent Application No. 2012-039609 filed on Feb. 27, 2012. The entire disclosures of PCT Application No. PCT/JP2012/003480 and Japanese Patent Application No. 2012-039609 are hereby incorporated herein by reference.

BACKGROUND

1. Field of the Invention

The present invention relates to a technology for accessing data.

2. Description of the Related Art

When a plurality of access devices that read and write data are connected to a single data recording device, the matching of the data recorded to and held in the data recording device must be maintained between access devices. Various technologies have been disclosed in the past to this end.

Japanese Laid-Open Patent Application H8-153014 discloses processing that is performed when one of a plurality of client devices which share a solid state disk device (or SSD: Solid State Drive) writes data to the SSD. Here, lock processing is performed to declare that this client device has acquired a file management information right to the SSD, after which the data writing is carried out. Once the data writing is finished, the client device performs unlock processing and relinquishes the file management information right.

With the method in Japanese Laid-Open Patent Application H8-153014, a plurality of access devices (that is, client devices) perform mutually exclusive processing when data is written to a single data recording device, modified, etc. This exclusive processing prevents plural sets of data from being written to the data recording device, modified, etc., at the same time.

In the field of communications technology, there is a known technique in which out of a plurality of communication devices connected to a communication line, only a communication device having an exclusive right, which specifies the communication device that is allowed to send data to a communication network (hereinafter also called a data control right or host right), actively sends data, or proactively controls communication. In this case, setting the host right is a specific way to achieve a kind of exclusive control.

However, the following problem can occur when one communication device has the host right, and another communication device forcibly takes back this host right at some point in time.

The right to send data to a communication network and so forth is managed along with transfer of the host right. Thus, although matching is maintained for the communication network as a whole, the communication device that relinquishes the host right ends up having its content that is being processed interrupted when its host right is taken away. If this interrupted content processing involves data writing, modification, reading, or the like performed at the data recording device shared among communication devices, there is the possibility that matching of the data will not be preserved.

In view of this, it is an object of the present invention to maintain data matching even when access to the data recording device, etc., is interrupted.

SUMMARY

In one aspect of the present invention, an access device configured to control reading or writing of data via a communication line comprises a memory configured to store data, a first controller configured to receive, via a communication line, a data control right that is an exclusive right to execute the reading or the writing of data stored in the memory, and a second controller configured to control transmission and reception of data to and from a data recording device connected to the access device, acquire or release the data control right according to a command from the first controller, and write to the memory the data that is transferred from the data recording device while holding the data control right. The first controller is configured to release the data control right to the second controller when having received a request to interrupt the transfer of the data while data is being transferred from the data recording device, determine whether or not mismatching has occurred in data management information for data stored in the memory, and return the data control right to the second controller when determining that mismatching of the management information has occurred. The second controller is configured to release the data control right after eliminating the mismatching of the data management information according to the returned data control right.

In another aspect of the present invention, a communication system comprises the above-mentioned access device and a data recording device connectable to the access device, wherein the data recording device has a data storage component configured to store data, and a data transfer controller configured to control transfer of data stored in the data storage component. The data transfer controller is configured to acquire data management information from the second controller of the access device, transfer the data stored in the data storage component to the access device on the basis of the data management information, interrupt the transfer of data upon receiving from the access device the request to interrupt the transfer of data while transferring data to the access device, determine whether or not there is mismatching of the data management information after interrupting the transfer of data, and send at result of the determination to the access device.

In yet another aspect of the present invention, an access device configured to control reading or writing of data via a communication line comprises a memory configured to store data, a first controller configured to send and receive, via the communication line, a data control right that is an exclusive right to execute the reading or the writing of data stored in the memory, and a second controller configured to control the transmission and reception of data to and from a data recording device connected to the access device, acquire or release the data control right according to a command from the first controller, and write to the memory the data that is transferred from the data recording device while holding the data control right. The first controller is configured to request the data control right of the second controller upon receiving a request to interrupt the transfer of data while data is being transferred from the data recording device, produce a command signal for interrupting the transfer of data, and send the command signal through the second controller to the data recording device. The second controller is configured to release the data control right after eliminating mismatching of management information for data stored in the memory following the sending of the command signal for interrupting the transfer of data.

In yet another aspect of the present invention, a communication system comprises the above-mentioned access device and a data recording device connectable to the access device, wherein the data recording device includes a data storage component configured to store data, and a data transfer controller configured to control the transfer of data stored in the data storage component. The data transfer controller is configured to acquire data management information from the second controller of the access device, transfer the data stored in the data storage component to the access device on the basis of the data management information, determine whether or not there is mismatching of the data management information upon receiving from the access device the request to interrupt the transfer of data while transferring data to the access device, and send information for eliminating the mismatching of the data management information to the second controller of the access device when determining that there is mismatching of the data management information.

In yet another aspect of the present invention, there is provided a communication device that comprises the access device pertaining to any of the above aspects, a central controller configured to send the request to interrupt the transfer of data to the first controller of the access device according to user manipulation, acquire the data control right from the first controller, and write or read data to the memory, a display component configured to display a result of processing by the central controller, and a manipulation component configured to be manipulated by the user.

In yet another aspect of the present invention, there is a provided a data access method featuring the access device pertaining to any of the above aspects.

With the present invention, data matching can be maintained even when access to a data recording device or the like is interrupted.

DETAILED DESCRIPTION

1. Embodiment 1

1.1. Communication System 100

Figure 1:
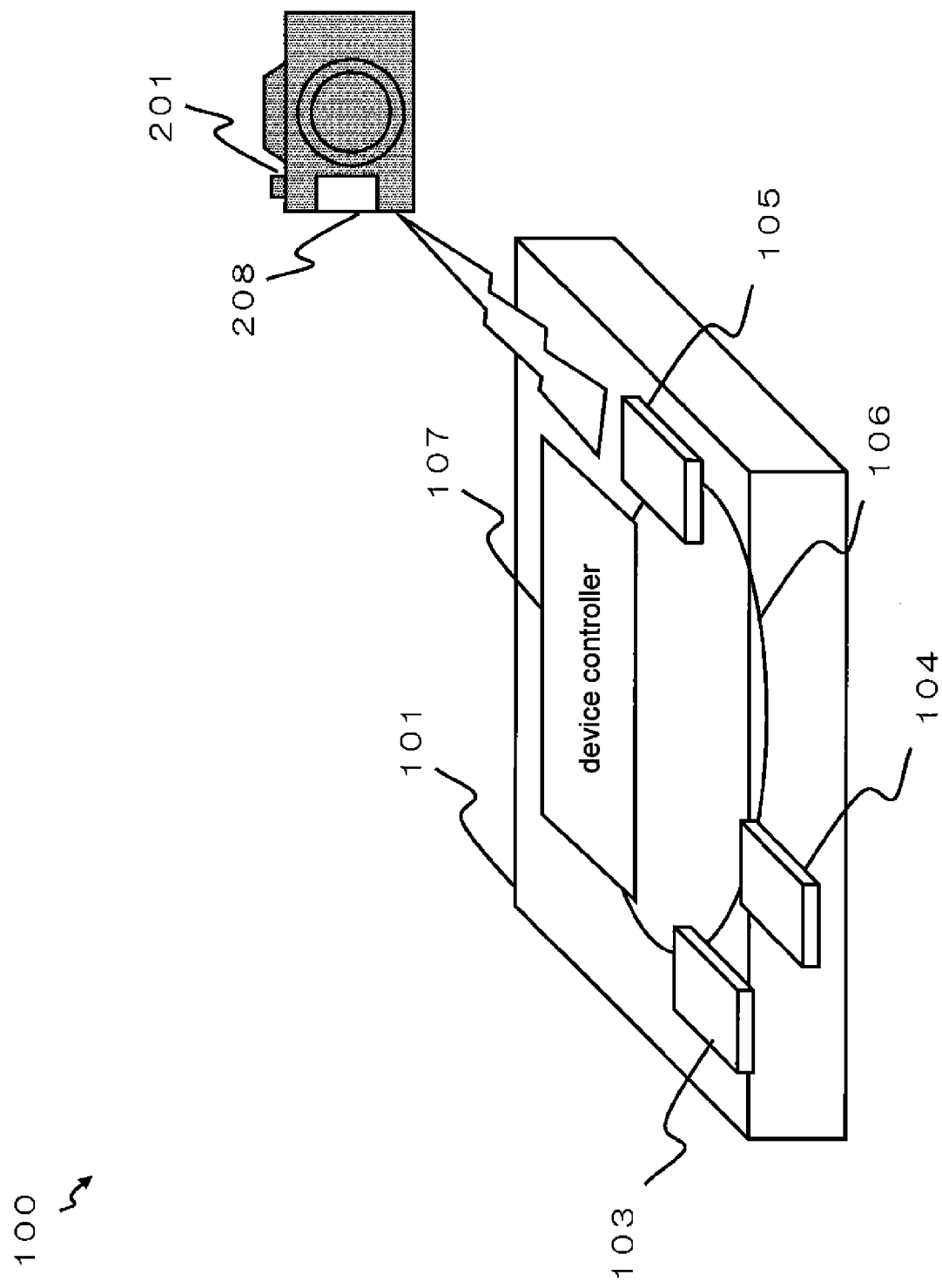
FIG. 1 is a simplified diagram of a communication system in Embodiment 1.

FIG. 1 is a diagram of the configuration of a communication system 100, which is one example in an embodiment of the present invention. The communication system 100 in FIG. 1 comprises a smart phone 101 (one example of a communication device) and a digital camera 201 (one example of a data recording device).

The smart phone 101 includes a device controller 107, a built-in memory device 103, a GPS device 104, and a WiGig (wireless gigabit) device 105. The device controller 107, the built-in memory device 103, the GPS device 104, and the WiGig device 105 are connected by a ring bus 106.

WiGig is a near-field wireless interface that allows transfer at a rate of giga-bps or higher. When the user moves the digital camera 201 into close proximity with the smart phone 101, a WiGig device 208 provided inside the digital camera 201 is able to communicate with the WiGig device 105 according to a specific communication protocol.

Basically, the device controller 107 controls communication between devices on the ring bus 106. The smart phone 101 can connect to the Internet or communicate with other peripheral devices using the WiGig device 105. Images, video, and other such data are stored in the built-in memory device 103.

The digital camera 201 produces captured images and video as digital data, and stores these in a data storage component 213, which is an internal recording medium. The data storage component 213 is a nonvolatile memory, for example.

FIG. 1 illustrates a digital still camera and a smart phone as examples, but this embodiment is not limited to or by these, and the category is not limited as long as the device is one that produces data or receives it from the outside and records it to another device. Examples of devices other than digital still cameras include video cameras, audio recorders, and broadcast receiver recorders.

In the description that follows, the smart phone 101 is described as a host device, and the digital camera 201 as a peripheral device.

Figure 2:
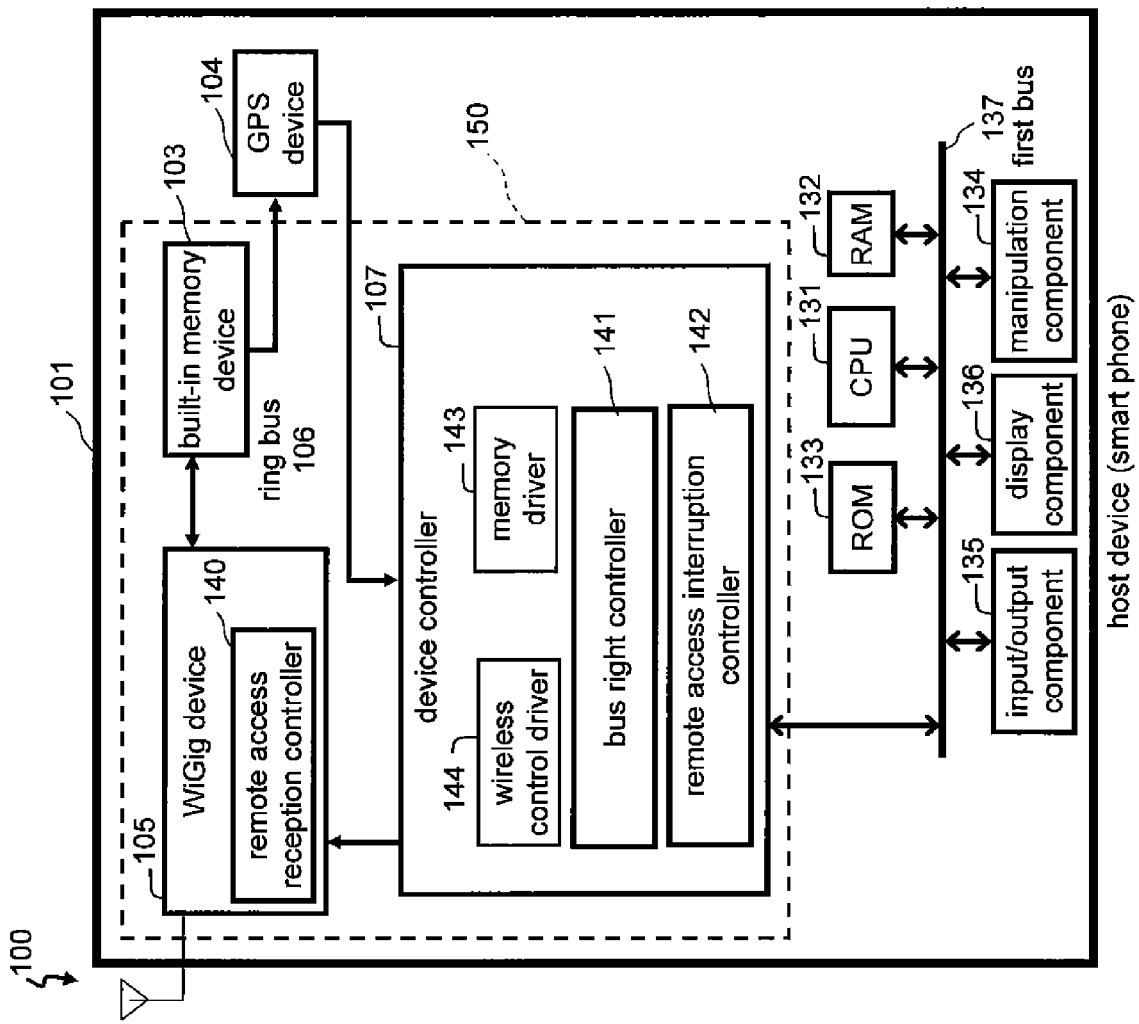
FIG. 2 is a functional configuration diagram of the communication system in Embodiment 1.
Figure 2:
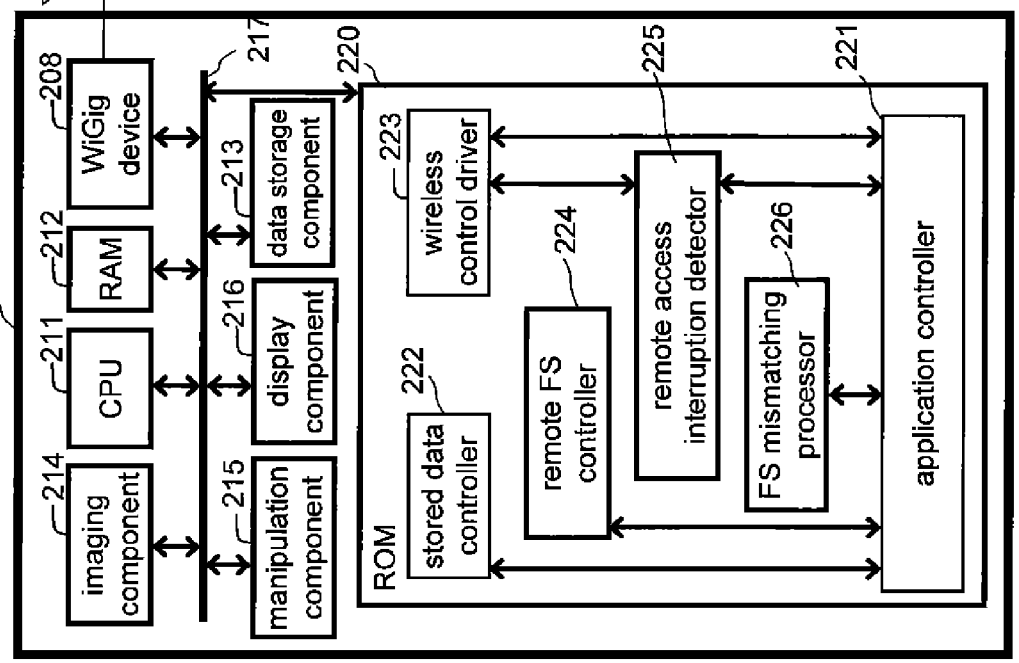

FIG. 2 is a diagram showing the functional configuration of the communication system 100 in FIG. 1. In FIG. 2, the communication system 100 has the smart phone 101 (hereinafter referred to as the host device 101), the digital camera 201 (hereinafter referred to as the peripheral device 201), and a communication line that connects these. The host device 101 and the peripheral device 201 may be connected by a wireless communication network or a wired communication network.

1.1.1. Host Device 101

The host device 101 establishes communication with the peripheral device 201 on the basis of a specific communication protocol, and sends and receives data and control signals. In this embodiment, the host device 101 has an access device 150, the GPS device 104, and the ring bus 106 (one example of a communication line). The access device 150 has the built-in memory device 103 (one example of a memory), the WiGig device 105 (one example of a second controller), and the device controller 107 (one example of a first controller). The built-in memory device 103, the GPS device 104, the WiGig device 105, and the device controller 107 are connected by the ring bus 106. The host device 101 further comprises a CPU 131 (one example of a central controller) connected by a first bus 137, a RAM (random access memory) 132, a ROM (read only memory) 133, a manipulation component 134 (one example of a manipulation component), an input/output component 135, and a display component 136 (one example of a display component).

The built-in memory device 103 stores a file allocation table (FAT), directory entries (D.E.), and other such FS (file system) management information with the setting of a processing start logical address and processing size in a logical address space that logically manages the memory region. The built-in memory device 103 also controls the reading and writing of captured image and video data and stores this data using specific commands and protocols. For example, the built-in memory device 103 includes a controller that controls a nonvolatile memory and the sending and receiving of data to and from the nonvolatile memory. In this embodiment, the storage of data in the built-in memory device 103 is managed not only by a file system stored in the ROM of the host device 101, but also by protocols or commands (discussed below) from the peripheral device 201. In this embodiment a file allocation table (FAT) was described as an example, but this is not the only option, and an NFTS (new file system), HSF (hierarchical file system), or other such file system may be used instead.

The GPS device 104 is used to detect the current position of the host device 101.

The WiGig device 105 is an interface portion used to connect the peripheral device 201 and the host device 101, and sends and receives control signals and data. The WiGig device 105 has a remote access reception controller 140. The remote access reception controller 140 has the function of sending the WiGig device 105 a remote access permission signal that allows control signals and data from the peripheral device to be sent and received when a host right (discussed below) has been transferred, and allowing other devices to be controlled via the ring bus 106. Upon receiving a control signal (a host right release request) for returning a host right (one example of a data control right) that is being held, the remote access reception controller 140 sends the peripheral device 201 a user interrupt command notifying that the transmission and reception of commands and data (one example of the transfer of data) has been interrupted, and returns the host right to the device controller 107. The remote access reception controller 140 also has the function of receiving from the peripheral device 201 an FS mismatching notification that includes information indicating whether or not mismatching of the file system, that is, mismatching of the management information in the file system, has occurred due to interruption of the exchange of commands and data, and notifying the device controller 107 whether or not file system mismatching has occurred.

The ring bus 106 is a connected data wire or the like that is used to receive data between the various function blocks, namely, the built-in memory device 103, the GPS device 104, the WiGig device 105, and the device controller 107. The wiring layout in FIG. 2 is a ring-shaped connection layout, but this embodiment is not limited to this, and some other connection layout may be used instead.

The device controller 107 is controlled by specific protocols and commands sent from the CPU 131 via the first bus 137. Consequently, the built-in memory device 103, the GPS device 104, and the WiGig device 105 connected to the ring bus 106 are controlled by specific protocols and commands. The device controller 107 comprises a bus right controller 141, a remote access interruption controller 142, a memory driver 143, and a wireless control driver 144.

Upon receiving a command from the CPU 131 to hand over the host right to another device, the bus right controller 141 issues a control signal to hand over the host right to another device according to the command (host right transfer). Usually, the device controller 107 holds a host right to control the transmission and reception of data and the issuance of commands through the ring bus 106 to the built-in memory device 103. The device to which the host right is given is allowed to control the transmission and reception of data and commands with respect to yet another device connected to the ring bus 106, according to a specific protocol. In this embodiment, we will assume that the host right is handed over to the WiGig device 105, and the WiGig device 105 controls the built-in memory device 103.

The remote access interruption controller 142 has the function of performing processing to acquire the host right from the device that has the host right (hereinafter referred to as a first device). When another device within the ring bus 106 (hereinafter referred to as a second device) is accessed from the CPU 131, a control signal for acquiring the host right is sent to the first device having the host right (host right release request), and a response confirming that the host right has been released is received from the first device (host right release). After this, the remote access interruption controller 142 issues a control signal for confirming the occurrence of FS mismatching in order to confirm whether or not there is mismatching of the management information in the file system. If mismatching has occurred in the file system, the transfer of the host right is again performed (host right transfer (FS mismatching elimination command)) in order to eliminate the mismatching of the file system, and the host right is returned to the first device that released the host right. Once the mismatching of the file system has been eliminated, the system waits for the first device to release the host right again. After the host right has again been returned, the second device connected to the ring bus 106 is controlled on the basis of a control signal from the CPU 131.

The memory driver 143 is a function for controlling the built-in memory device 103 on the basis of a control signal from the CPU 131.

The wireless control driver 144 is a function for controlling the WiGig device 105 on the basis of a control signal from the CPU 131.

The CPU 131 controls the entire host device 101. More specifically, the CPU 131 controls other constituent components by executing a program recorded to the ROM 133.

The ROM 133 stores programs for controlling and initializing the power supply of the host device 101, controlling the display of images and video, and so forth. These programs use a RAM 12 as a temporary memory region, etc., and operate on the CPU 131. The ROM 133 also has a file system program that writes and reads data to and from the built-in memory device 103, and manages this data in file units.

The RAM 132 is a temporary storage region for data that is necessary when the CPU 131 executes the above-mentioned programs, etc., or a region for recording and storing program data when executing programs recorded to the ROM 133. The RAM 132 may also be used for other applications.

The manipulation component 134 is a button or the like that is operated by the user to make communication settings with the peripheral device 201 or to view images or video.

The input/output component 135 is used to mount a microphone, a speaker, or another such accessory device.

The display component 136 displays the results of the processing done by the CPU 131. More specifically, it is used to display images, video, or information to be manipulated by the user, and consists of a liquid crystal panel.

The first bus 137 is a data wire or the like that is used to connect for receiving and sending data between the functional components, namely, the device controller 107, the CPU 131, the RAM 132, the ROM 133, the manipulation component 134, the input/output component 135, and the display component 136.

1.1.2. Peripheral Device 201

The peripheral device 201 establishes communication with the host device 101 on the basis of a specific communication procedure, and exchanges data and control signals. In this embodiment, the peripheral device 201 comprises the WiGig device 208, a CPU 211, a RAM 212, the data storage component 213, an imaging component 214, a manipulation component 215, a display component 216, a bus 217, and a ROM 220. A digital camera is given here as an example of the peripheral device 201.

The WiGig device 208 is an interface portion used to connect the peripheral device 201 and the host device 101, and sends and receives control signals and data.

The CPU 211 controls the entire peripheral device 201. More specifically, the CPU 211 controls other constituent components by executing a program recorded to the ROM 220.

The RAM 212 is a temporary storage region for data that is necessary when the CPU 211 executes programs, etc., or a region for recording and storing program data when executing programs recorded to the ROM 220. The RAM 212 may also be used for other applications.

The data storage component 213 stores images, video, and other such data captured by an imaging component 214. Also, data to be sent to the outside storage component through the WiGig device 208 is read from the data storage component 213.

The imaging component 214 produces image data by converting light that is incident on a subject through a lens into an electrical signal.

The manipulation component 215 is a release button for starting and ending imaging, or some other such setting button, which is operated by the user.

The display component 216 is used to display image data captured and produced by the imaging component 214, and consists of a liquid crystal panel or the like.

The bus 217 is a data wire or the like for connecting the various functional components so that they can receive data among themselves. The wiring layout in FIG. 2 is a bus type of connection layout, but this embodiment is not limited to this, and may involve some other connection layout.

(1) The ROM 220 stores programs for controlling the peripheral device 201, etc. These programs use the RAM 212, etc., as a temporary memory region, and operate on the CPU 131. The programs recorded to the ROM 220 have functional units such as an application controller 221, a stored data controller 222, a wireless control driver 223, a remote FS (file system) controller 224 (one example of a data transfer controller), a remote access interruption detector 225 (one example of a data transfer controller), an FS (file system) mismatching processor 226 (one example of a data transfer controller), and so forth. These are constituted by software that can operate on the CPU 211, but some or all of them may instead be constituted by hardware.

The application controller 221 controls the entire peripheral device 201, such as controlling and initializing the power supply of the peripheral device 201, controlling programs for capturing images, preparing, starting, and ending imaging based on what is input to the manipulation component 215, and establishing communication with the host device 101.

The stored data controller 222 is a program that writes and reads data to and from the data storage component 213, and manages this data in file units.

The wireless control driver 223 is a program for controlling the WiGig device 208 on the basis of control signals from the CPU 211.

The remote FS controller 224 reads a file allocation table (FAT), directory entries (D.E.), and other such FS (file system) management information in a logical address space that logically manages the memory region of the built-in memory device 103 in the host device 101 via the WiGig devices 105 and 208. The remote FS controller 224 has the function of searching for empty clusters on the basis of the read FS management information, and transferring captured image or video data in the data storage component 213 to the built-in memory device 103. That is, this remote FS controller 224 performs the setting of a processing start logical address and processing size, and the production of data to be written to the FS management information.

The remote access interruption detector 225 receives user interrupt commands from the host device 101 when the remote FS controller 224 is transferring images, video, or the like, and interrupts the transfer of data by the remote FS controller 224 and hands over the processing to the FS mismatching processor 226.

The FS mismatching processor 226 confirms whether or not the interruption was at the place where file system mismatching occurred when the transfer of data was interrupted, and if no mismatching has occurred, notifies the host device 101 of the completion of remote access, via the WiGig devices 105 and 208. If mismatching has occurred, an FS mismatching notification that notifies of the occurrence of file system mismatching is sent to the host device 101 via the WiGig devices 105 and 208. After sending the FS mismatching notification, the FS mismatching processor 226 waits for remote access permission from the host device 101 again. After permission is granted, the FS mismatching processor 226 sends data and commands for eliminating the mismatching of FS management information about the written data, the FAT, and the directory entries of the file system so that the image or video data written halfway can be reproduced as much as possible, and sends a notification of the completion of remote access once this is complete.

1.2. Processing by Communication System 100

Figure 3:
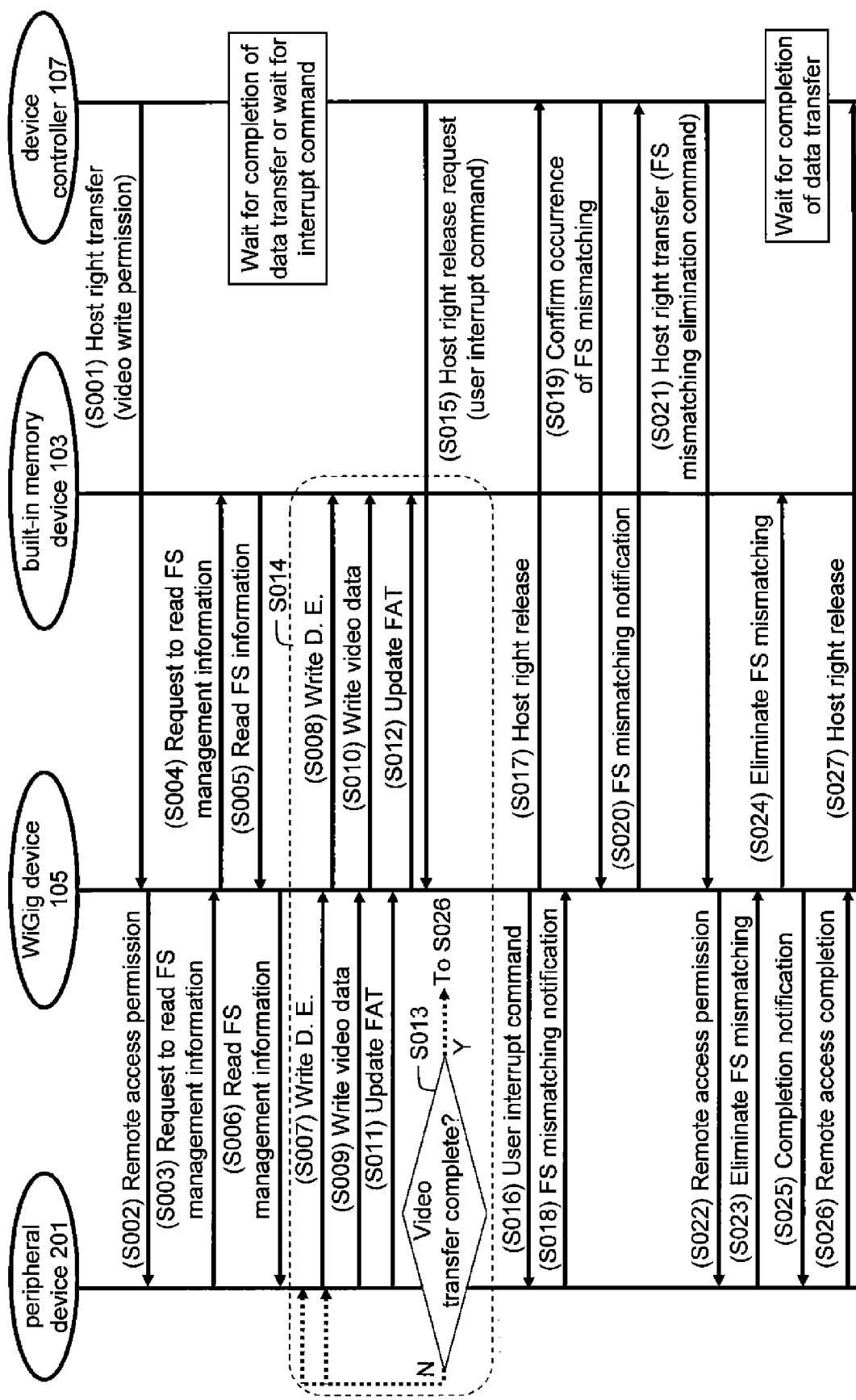
FIG. 3 is a sequence diagram between the constituent components in Embodiment 1.

The processing performed by the communication system 100 pertaining to this embodiment constituted as above will be described through reference to FIG. 3. FIG. 3 shows the processing when there is an interrupt from the host device 101 in the middle of transferring video data from the peripheral device 201 to the built-in memory device 103 of the host device 101. We will assume that the host device 101 and the peripheral device 201 have established a state in which commands and data can be exchanged using a specific protocol via the WiGig devices 105 and 208, and the following description starts from the point at which the peripheral device 201 begins to remotely access the built-in memory device 103, which is the key point of this embodiment.

In step S001, a control signal for host right transfer is received by the device controller 107 from the CPU 131. The device controller 107 sends the WiGig device 105 a control signal for host right transfer (video write permission). The device controller 107 then waits for the host right to be released, and waits for an interrupt command that is issued when the user of the host device 101 has performed manipulation for interrupting data transfer.

In step S002, when the WiGig device 105 receives a control signal for host right transfer from the device controller 107, a remote access permission signal that allows the transmission and reception of control signals to and from the peripheral device 201 is sent by the remote access reception controller 140 to the peripheral device 201.

In step S003, when the remote access permission signal is received via the WiGig device 208 of the peripheral device 201, the remote FS controller 224 produces information of the processing size and the processing start logical address for acquiring the FS management information of the built-in memory device 103. The produced information is sent as a control signal requesting the reading of FS management information, via the WiGig device 208, to the host device 101.

In step S004, the remote access reception controller 140 receives the control signal requesting the reading of FS management information, via the WiGig device 105. The remote access reception controller 140 converts the received information into commands and protocols that the built-in memory device 103 can interpret, and issues a request to the built-in memory device 103 to read FS management information.

In step S005, the FS management information is read from the built-in memory device 103 to the WiGig device 105.

In step S006, the WiGig device 105 transmits the FS management information. The remote FS controller 224 of the peripheral device 201 receives the FS management information, thereby resulting in a so-called mounted state in which it can be ascertained which memory region of the built-in memory device 103 can be written to.

The processing in steps S007 to S014 relates to processing for sending image, video, or other data that was decided on ahead of time between the host device 101 and the peripheral device 201, from the data storage component 213 of the peripheral device 201 to the built-in memory device 103 of the host device 101.

In step S007, the remote FS controller 224 produces a processing start address and processing size for writing directory entries (D. E.) from the FS management information, and sends these control signals and data through the WiGig device 208 to the host device 101.

In step S008, the control signals and data for D.E. writing are received by the remote access reception controller 140 via the WiGig device 105. The remote access reception controller 140 converts these control signals and data into protocols and commands that can be interpreted by the built-in memory device 103, and issues the result. Although not depicted in the drawings, information about whether or not this writing was successful is returned to the remote FS controller 224 of the peripheral device 201.

In step S009, part of the video data stored in the data storage component 213 is read by the remote FS controller 224, a processing start address and processing size for identifying and writing to empty clusters are produced from the FS management information, and these control signals and data are sent to the host device 101.

In step S010, the control signals and data for writing part of the video data are received by the remote access reception controller 140 via the WiGig device 105. The remote access reception controller 140 converts these control signals and data into commands and protocols that can be interpreted by the built-in memory device 103, and issues the result. Although not depicted in the drawings, information about whether or not this writing was successful is returned to the remote FS controller 224 of the peripheral device 201.

In step S011, the remote FS controller 224 produces FAT information for updating the FS management information, produces the processing start address and processing size for writing, and sends these control signals and data to the host device 101.

In step S012, the control signals and data for updating the FAT are received by the remote access reception controller 140 via the WiGig device 105. The remote access reception controller 140 converts these control signals and data into commands and protocols that can be interpreted by the built-in memory device 103, and issues the result. Although not depicted in the drawings, information about whether or not this writing was successful is returned to the remote FS controller 224 of the peripheral device 201.

Step S013 involves confirming whether or not the writing of the entire selected video file has ended, that is, whether or not the transfer of video is complete. If the writing of the entire selected video file has ended, the process proceeds to step S026. If the writing of the entire selected video file has not ended, the process returns to step S007.

Step S014 indicates that steps S007 to S013 are repeated until the entire file has been written. If the user of the host device 101 performs a manipulation to interrupt the transfer of data in the midst of this step S014, a user interrupt command signal is sent from the CPU 131 to the device controller 107.

In step S015, the remote access interruption controller 142 of the device controller 107 that has received the user interrupt command signal sends the WiGig device 105 a host right release request signal (user interrupt command), via the ring bus 106.

In step S016, if the WiGig device 105 has received the host right release request signal (user interrupt command), the remote access reception controller 140 sends the peripheral device 201 a user interrupt command notifying that the transmission and reception of commands and data have been interrupted.

In step S017, the remote access reception controller 140 sends a host right release signal releasing the host right to the device controller 107.

In step S018, the remote access interruption detector 225 that has received the user interrupt command interrupts the transfer of video by the remote FS controller 224, and hands over the processing to the FS mismatching processor 226. The FS mismatching processor 226 confirms whether or not the interruption was at the place where the mismatching of the file system occurred during the interruption of the data transfer. If no mismatching has occurred, the process proceeds to step S026. If mismatching has occurred, an FS mismatching notification for notifying that mismatching of the file system has occurred is sent through the WiGig devices 105 and 208. After this FS mismatching notification, the WiGig device 105 temporarily ends the remote access of the peripheral device 201.

In step S019, the remote access interruption controller 142 of the device controller 107 to which the host right was returned issues to the WiGig device 105 a control signal for confirming whether or not mismatching has occurred in the file system.

In step S020, the remote access reception controller 140 of the WiGig device 105 returns information from the peripheral device 201 about whether or not file system mismatching has occurred, as a response to a control signal that is an inquiry from the device controller 107. In this embodiment, the response that file system mismatching has occurred is returned. There may be cases in which the timing at which information about whether or not file system mismatching has occurred is sent from the peripheral device 201 is delayed, and the confirmation requested by the device controller 107 cannot be granted. If this happens, a response indicating that confirmation is in progress, etc., may first be returned to the device controller 107, for example. Using an interruption or another such method may also be employed.

In step S021, if the device controller 107 receives information to the effect that file system mismatching has occurred, the bus right controller 141 sends the WiGig device 105 a control signal for a host right transfer (FS mismatching elimination command).

In step S022, if the WiGig device 105 receives a control signal for a host right transfer (FS mismatching elimination command), the remote access reception controller 140 sends the peripheral device 201 a remote access permission signal so that data and control signals can be sent and received to and from the peripheral device 201.

In step S023, when the peripheral device 201 receives the remote access permission signal, the FS mismatching processor 226 performs the following processing so as to create a state in which image or video data written halfway can be reproduced as much as possible. Data including the processing start logical address and processing size is produced and sent to the host device 101 as FS mismatching elimination information for eliminating the mismatching of file system directory entries, the FAT of the file system, and written data.

In step S024, the remote access reception controller 140 receives the FS mismatching elimination information via the WiGig device 105, and converts this information into commands and protocols that can be interpreted by the built-in memory device 103.

In step S025, the remote access reception controller 140 sends the peripheral device 201 a signal for notifying that writing to the built-in memory device 103 is complete. The processing for FS mismatching elimination in steps S023 to S025 is repeated a number of times until the mismatching is eliminated, but this is omitted here.

In step S026, a control signal for remote access completion, notifying that the processing of the FS mismatching processor 226 is complete, is sent to the host device 101.

In step S027, the control signal for remote access completion is received via the WiGig device 105, and the remote access reception controller 140 sends a control signal for host right release, by which the host right is released to the device controller 107. Upon receiving the control signal for this host right release, the device controller 107 notifies the CPU 131 that data transfer interrupt processing is complete, and thereafter the built-in memory device 103 can be accessed by the CPU 131.

1.2.1. Processing by Host Device 101

Figure 4:
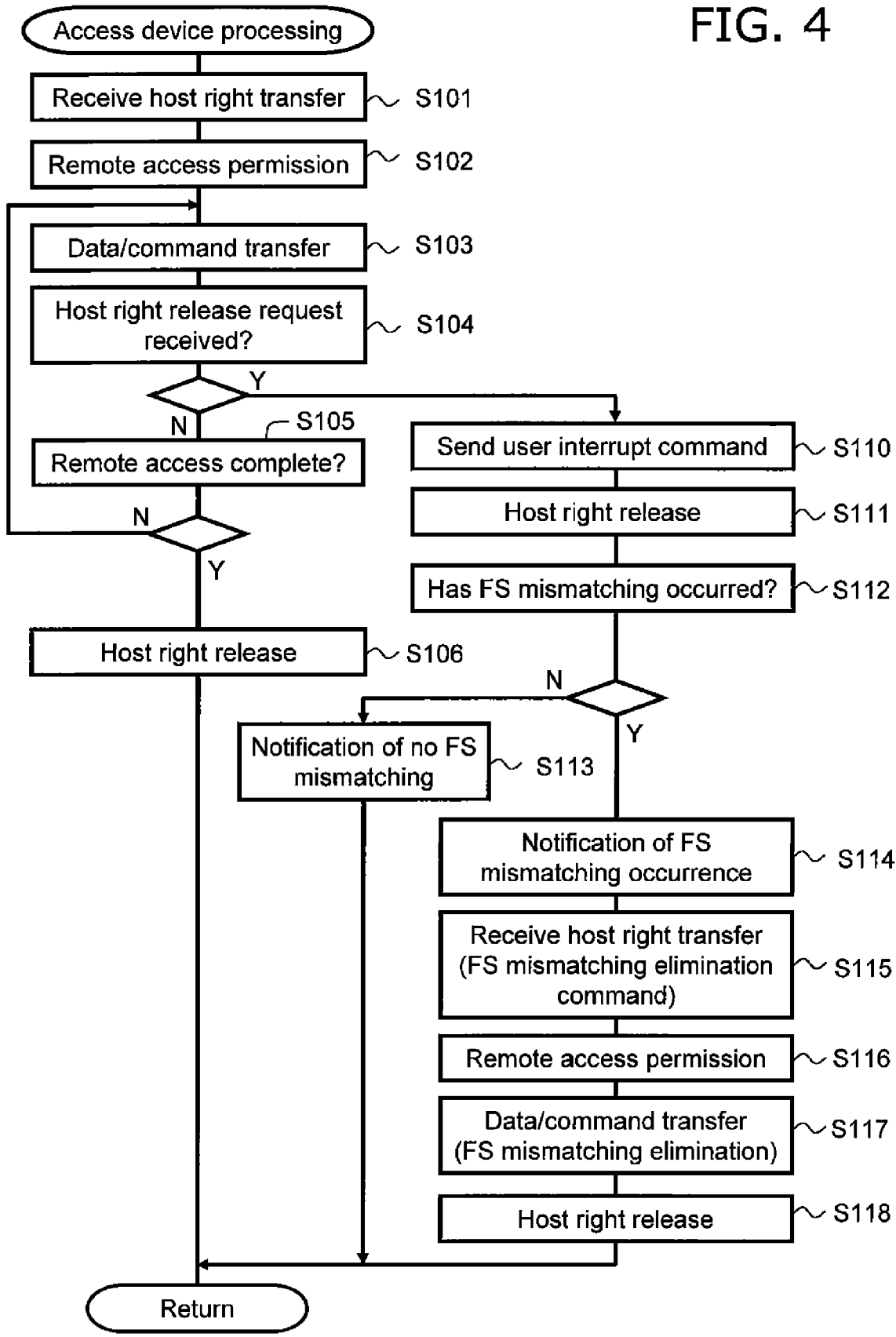
FIG. 4 is a flowchart of processing performed by the access device in Embodiment 1.

Next, the processing performed by the access device 150 in the host device 101 to achieve the communication system 100 pertaining to this embodiment, and particularly the processing procedure of the remote access reception controller 140 of the WiGig device 105, will be described through reference to FIG. 4. The WiGig device 105 receives many different kinds of control signals from the device controller 107, and the remote access reception controller 140 in this embodiment begins processing when the WiGig device 105 has received a control signal for transferring the host right.

In step S101, the system waits to receive a control signal for host right transfer, and the process proceeds to step S102 once the control signal for host right transfer is received.

In step S102, a remote access permission signal that allows access from the peripheral device 201 is sent to the peripheral device 201.

In step S103, when processing start address, processing size, and write data with respect to the built-in memory device 103 come in from the peripheral device 201, that data is converted into commands and protocols that can be interpreted by the built-in memory device 103 and data, and these are sent to the built-in memory device 103. Information about whether this transmission has succeeded or failed and (if available) read data from the built-in memory device 103 are sent to the peripheral device 201.

In step S104, it is confirmed whether or not a request for host right release has been received from the device controller 107. If a host right release request has been received, the process proceeds to step S110, and if it has not been received, the process proceeds to step S105.

In step S105, it is confirmed whether or not a remote access completion control signal indicating that the transfer of data from the peripheral device 201 has ended has been received. If the remote access completion control signal has been received, the process proceeds to step S106. If the remote access completion control signal has not been received, the process returns to step S103.

In step S106, the remote access reception controller 140 sends a control signal for host right release, by which the host right is released to the device controller 107. After this, the system reverts to a state of waiting to receive a control signal from the device controller 107.

In step S110, if a host right release request signal from the device controller 107 (user interrupt command) was received in step S104, the remote access reception controller 140 sends the peripheral device 201 a user interrupt command notifying that the transmission and reception of commands and data have been interrupted.

In step S111, the remote access reception controller 140 sends a host right release signal for releasing the host right to the device controller 107.

In step S112, the system waits for information from the peripheral device 201 indicating whether or not file system mismatching has occurred. For example, if a control signal for confirming mismatching has been received from the device controller 107 during this waiting, a reply is given to the effect that the system is on standby. If the result of confirmation of file system mismatching has been received from the peripheral device 201, and no mismatching has occurred, then the process proceeds to step S113, and if mismatching has occurred, the process proceeds to step S114.

In step S113, a reply indicating that no file system mismatching has occurred is given in response to the control signal from the device controller 107 for confirming mismatching. After this, the process returns to step S101, which is the first standby state of the processing of the remote access reception controller 140, that is, a state prior to reception of the host right transfer from the device controller 107 by the WiGig device 105.

In step S114, a reply indicating that file system mismatching has occurred is given in response to the inquiry from the device controller 107, and the system awaits the next command.

In step S115, if a control signal for host right transfer for eliminating the file system mismatching (FS mismatching elimination command) is awaited and received, the process proceeds to step S116. If any other control signal is received, some other processing is performed, although not depicted in the drawings.

In step S116, a remote access permission signal is sent to the peripheral device 201 so that control signals for eliminating file system mismatching can be sent and received.

In step S117, information including the processing start address, processing size, and write data for eliminating mismatching of the file system is received from the peripheral device 201. The received information is converted into data, commands, and protocols that can be interpreted by the built-in memory device 103, and is sent to the built-in memory device 103. Information about whether this transmission has succeeded or failed is sent to the peripheral device 201. This step S117 is repeatedly performed until the file system mismatching is eliminated and a control signal indicating remote access completion is received.

In step S118, a control signal indicating the remote access completion is received, and a control signal for host right release, by which the host right is released to the device controller 107, is sent. After this, the process returns to the first standby state of the processing of the remote access reception controller 140.

1.2.2. Processing by Peripheral Device 201

Figure 5:
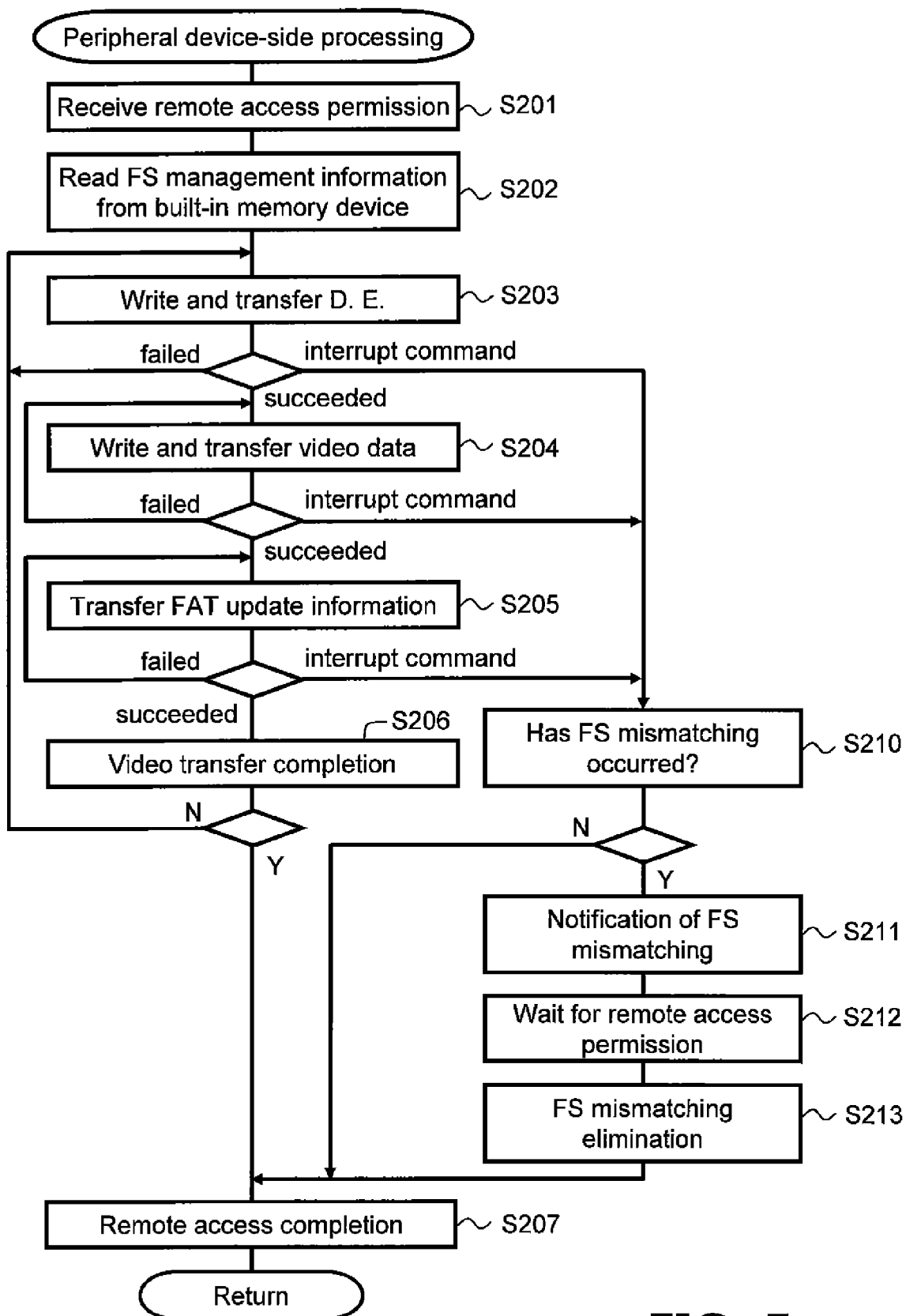
FIG. 5 is a flowchart of processing performed by peripheral devices in Embodiment 1.

Next, the procedure by which the peripheral device 201 transfers video or other such data to the built-in memory device 103 in the communication system of this embodiment, and the processing procedure for dealing with the situation when an interrupt command is received from the host device 101 in the midst of data transfer, will be described through reference to FIG. 5. The peripheral device 201 establishes communication with the host device 101 on the basis of a specific communication procedure, and is now in a state in which data and control signals can be exchanged. The processing in this state, after the receipt of a control signal for remote access permission, will be described.

In step S201, a control signal for remote access permission for accessing the built-in memory device 103 from the host device 101 is received.

In step S202, in order to acquire FS management information of the built-in memory device 103, the remote FS controller 224 produces information about the processing starting logical address and the processing size, and sends the host device 101 a control signal requesting that the FS management information be read. Data indicating the processing starting logical address and processing size specified by the host device 101 is received. The FS management information of the built-in memory device 103 can be read by repeating this process, and the place where data can be written to memory region can be identified, resulting in a so-called mounted state.

In step S203, the following processing is performed to transfer images, video, or other such file data, which is decided on ahead of time between the host device 101 and the peripheral device 201, to the built-in memory device 103 of the host device 101. The remote FS controller 224 produces the processing start address and processing size for writing the directory entries (D. E.) from the FS management information, and sends this control signal to the host device 101. If the transmission result is confirmed and found to be successful, the process proceeds to step S204. If the transmission has failed, a rewrite is attempted in step S203. If the remote access interruption detector 225 has received a user interrupt command, the process proceeds to step S210.

In step S204, the remote FS controller 224 reads some of the video data stored in the data storage component 213, finds empty clusters from the FS management information, produces the processing start address and processing size for writing, and sends this control signal to the host device 101. If the transmission was successful, the process proceeds to step S205. If the transmission has failed, a rewrite is attempted in step S204. If the remote access interruption detector 225 has received a user interrupt command, the process proceeds to step S210.

In step S205, the remote FS controller 224 produces FAT information for updating the FS management information, produces the processing start address and processing size for writing, and sends this control signal to the host device 101 via the WiGig device 208. If the transmission was successful, the process proceeds to step S206. If the transmission has failed, a rewrite is attempted in step S205. If the remote access interruption detector 225 has received a user interrupt command, the process proceeds to step S210.

Step S206 is for confirming whether or not the writing of all of the selected video files is finished. If the writing of all of the files is finished, the process proceeds to step S207. If the writing of all of the files is not finished, the process returns to step S203.

In step S207, a control signal indicating the completion of remote access, which notifies that the processing of the remote FS controller 224 has been completed, is sent to the host device 101, access to the built-in memory device 103 is ended, and the system returns to a state of waiting for the next processing.

In step S210, the remote access interruption detector 225 that has received a user interrupt command interrupts the transfer by the remote FS controller 224, and hands over processing to the FS mismatching processor 226. The FS mismatching processor 226 confirms whether or not the interruption was at a place where file system mismatching occurred when the transfer of data was interrupted. If no mismatching has occurred here, the process proceeds to step S207. If mismatching has occurred, the process proceeds to step S211.

In step S211, the FS mismatching processor 226 sends the host device 101 an FS mismatching notification to notify that mismatching has occurred in the file system.

In step S212, the system waits for a remote access permission signal from the peripheral device 201, and when this signal is received, the process proceeds to the next step.

In step S213, the following processing is performed by the FS mismatching processor 226 so that the image or video data written part of the way can be reproduced. The processing starting logical address and data are produced as a control signal indicating FS mismatching elimination for eliminating the mismatching of file system directory entries, the FAT, and written data, and these are sent to the host device 101. This step is repeated until the mismatching is eliminated, and when this is finished, the process proceeds to step S207.

1.3. Features of Embodiment 1

In the above embodiment, when the device controller 107 receives a request to interrupt transfer of data while the peripheral device 201 is transferring the data to the device controller 107, the device controller 107 makes the WiGig device 105 release the host right, determines whether or not mismatching of management information has occurred in the file system with the peripheral device 201, and if it is determined that mismatching has occurred, the host right is returned to the WiGig device 105, and the WiGig device 105 eliminates the mismatching of management information according to the returned host right, after which the WiGig device 105 releases the host right. Consequently, data matching can be maintained between the host device 101 and the peripheral device 201 even if data transfer is interrupted. That is, when the host right is forcibly acquired from the WiGig device 105, and when processing for access to the built-in memory device 103 by the WiGig device 105 remains unmatched, the host right is again returned to the WiGig device 105, the mismatched state is eliminated, and data matching can be maintained. Thus, the user can interrupt transfer midway without first waiting for the data transfer to end, which makes the device more convenient to use.

In the above embodiment, in the transfer of data from the peripheral device 201 to the host device 101, the device controller 107 transfers the host right to the WiGig device 105 (another controller) for writing data, rather than to the CPU 131 (the main controller) of the host device 101, so image or video data can be transferred without placing a burden on the CPU 131.

1.4. Modification Example of Embodiment 1

Figure 6:
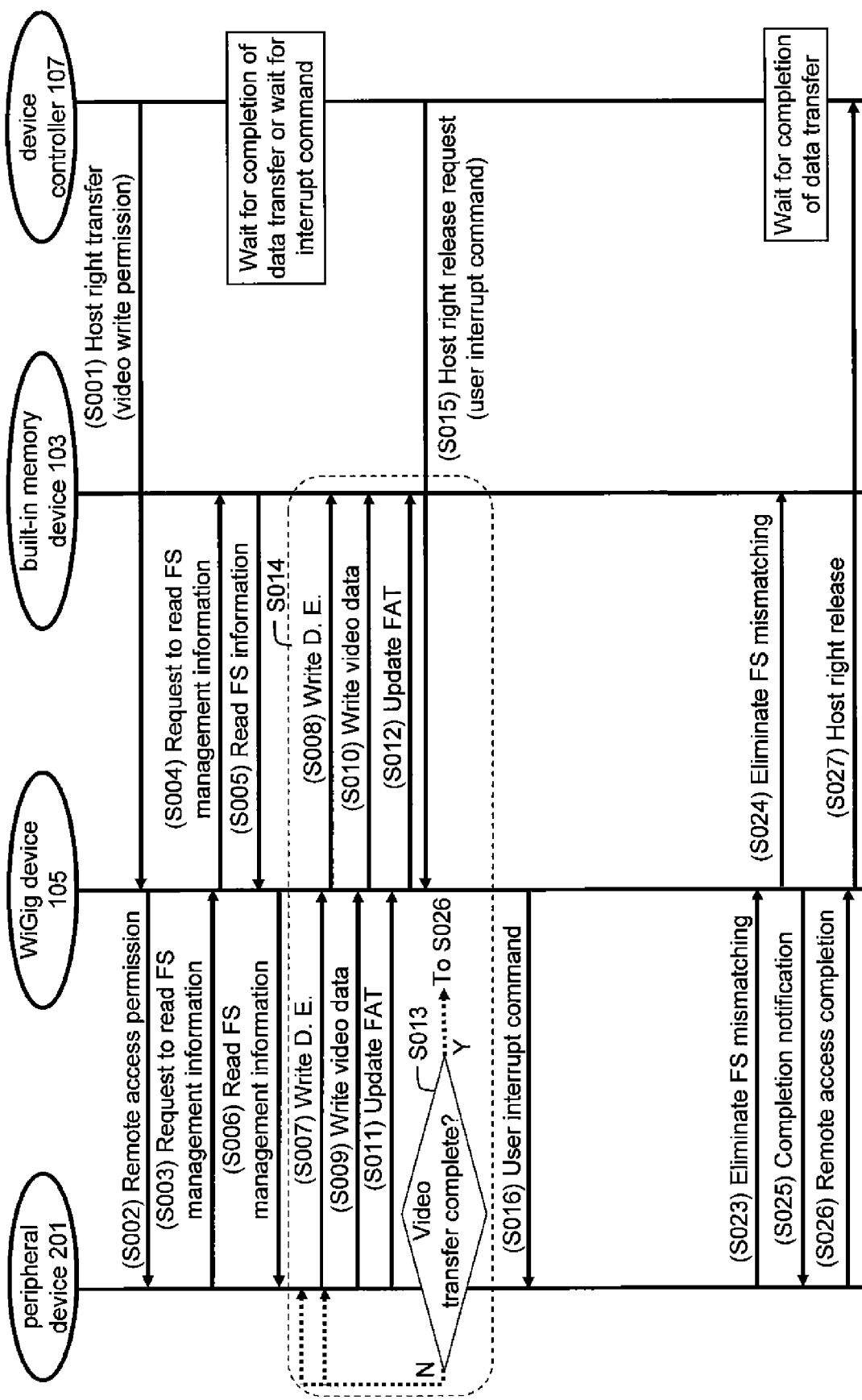
FIG. 6 is a sequence diagram between the constituent components in a modified example of Embodiment 1.

FIG. 6 shows the processing of the communication system 100 pertaining to a modification example of Embodiment 1. The processing shown in FIG. 6 differs from that in Embodiment 1 above in that the processing of steps S017 to S022 in FIG. 3 is not performed. This is described in specific terms below.

The WiGig device 105 receives a host right release request signal (user interrupt command) (step S015), and the remote access reception controller 140 sends the peripheral device 201 a user interrupt command notifying that the transmission and reception of commands and data was interrupted (step S016). The WiGig device 105 here differs from Embodiment 1 above in that it does not release the host right.

Meanwhile, at the peripheral device 201 that has received a user interrupt command, the remote access interruption detector 225 interrupts the transfer of video by the remote FS controller 224 and transfers the processing to the FS mismatching processor 226. The FS mismatching processor 226 confirms whether or not the interruption has occurred at the place where the file system mismatching occurred when the transfer of data was interrupted. If there is no mismatching here, the process proceeds to step S026.

If mismatching has occurred, the following processing is performed so as to create a state in which as much as possible of the image or video data that was written part of the way can be reproduced. Data including the processing starting logical address and the processing size is produced as information about FS mismatching elimination for eliminating the mismatching of file system directory entries, the FAT, and written data, and these are sent to the host device 101 (step S23).

The subsequent steps S024 to 027 are the same as in the example shown in FIG. 3.

With the communication system 100 pertaining to the above modification example, the WiGig device 105 does not release the host right as soon as the transfer of data is interrupted, and instead releases the host right after FS mismatching elimination has been performed. Therefore, compared to the example in FIG. 3, processing between the WiGig device 105 and the device controller 107 can be simpler, and the time it takes to eliminate mismatching in the event that FS mismatching should occur can be shortened.

2. Embodiment 2

2.1. Processing by Communication System 100

Figure 7:
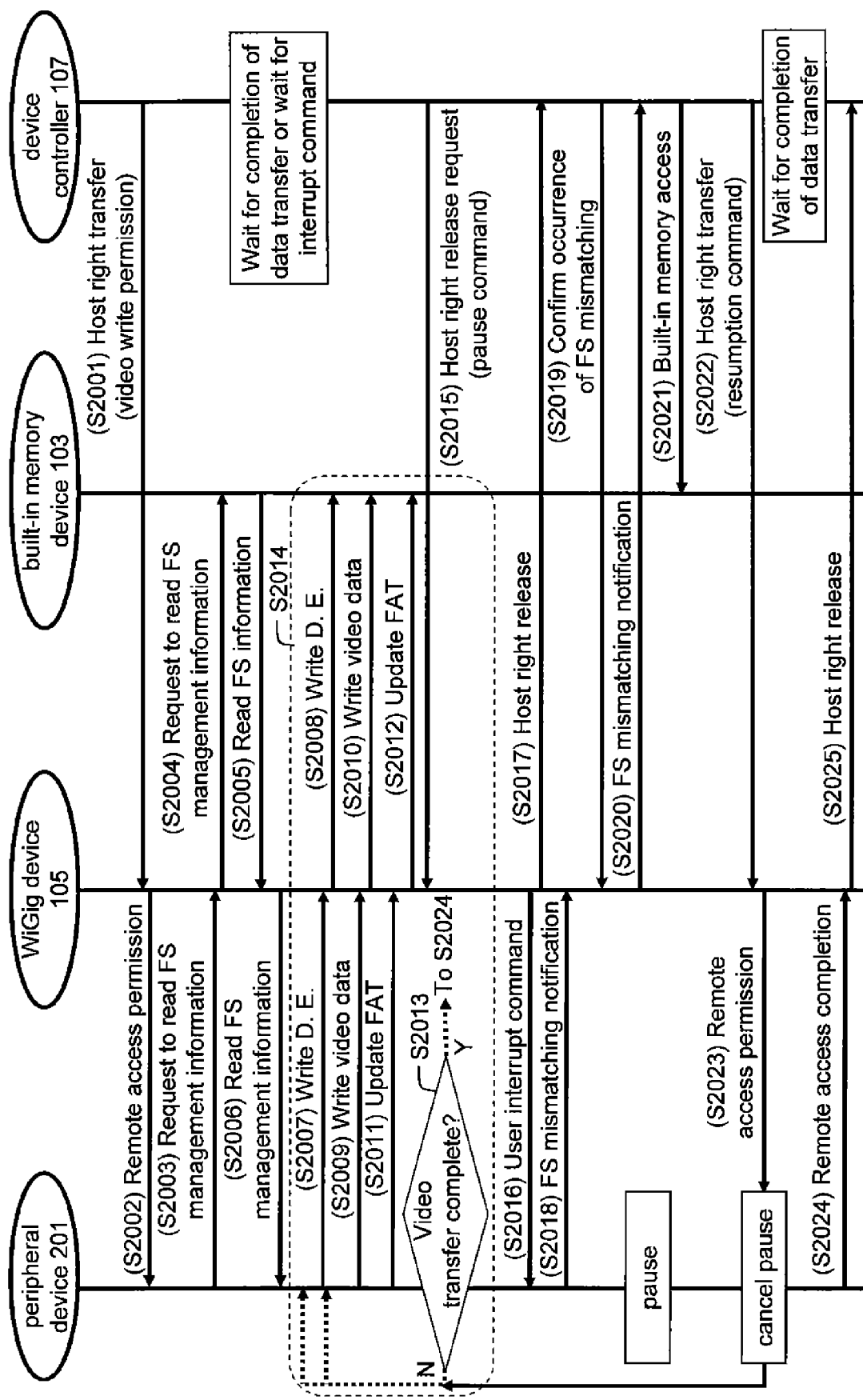
FIG. 7 is a sequence diagram between the constituent components in Embodiment 2.

FIG. 7 shows the processing of the communication system 100 pertaining to Embodiment 2. The communication system 100 pertaining to Embodiment 2 has the same configuration as what is shown in FIGS. 1 and 2. Components, functions, and processing that are the same as in Embodiment 1 will be numbered the same, and will not be described again in detail.

The processing from steps S2001 to S2014 is the same as that in steps S001 to S014 in FIG. 3.

In step S2015, the remote access interruption controller 142 of the device controller 107 that has received a signal indicating a user interrupt command from the CPU 131 in step S2014 sends a host right release request signal (pause command) through the ring bus 106 to the WiGig device 105.

In step S2016, when the WiGig device 105 receives a host right release request signal (pause command), the remote access reception controller 140 sends the peripheral device 201 a pause command.

In step S2017, the remote access reception controller 140 sends a host right release signal for releasing the host right to the device controller 107.

In step S2018, the remote access interruption detector 225 that has received the pause command interrupts the transfer of video by the remote FS controller 224, and hands over the processing to the FS mismatching processor 226. The FS mismatching processor 226 confirms whether or not the interruption was at the place where the mismatching of the file system occurred during the interruption of the data transfer. If no mismatching has occurred, the process proceeds to step S2024. If mismatching has occurred, an FS mismatching notification for notifying that mismatching of the file system has occurred is sent through the WiGig devices 105 and 208. Then, after sending the FS mismatching notification, the peripheral device 102 is controlled so as to be in a pause state, that is, a temporarily stopped state.

In step S2019, the remote access interruption controller 142 of the device controller 107 to which the host right has been returned issues to the WiGig device 105 a control signal for confirming whether or not mismatching has occurred in the file system.

In step S2020, the remote access reception controller 140 returns a reply to the control signal from the device controller 107, which includes information from the peripheral device 201 about whether or not mismatching has occurred in the file system, as. In this embodiment, the reply that is returned is that file system mismatching has occurred. There may be cases in which the timing at which information about whether or not file system mismatching has occurred is sent is delayed, so the confirmation requested by the device controller 107 cannot be granted. If this happens, a response indicating that confirmation is in progress, etc., may first be returned to the device controller 107, for example. Using an interruption or another such method may also be employed.

In step S2021, the device controller 107 to which the host right was released executes specific processing on the built-in memory device 103. This "specific processing" includes reading data from the built-in memory device 103, writing to a different logical address from that of the interrupted transfer data, and so forth. Thus, processing that can be performed on the built-in memory device 103 to the extent that no new mismatching occurs in management information can be executed while the data transfer from the peripheral device 102 is paused.

In step S2022, when the device controller 107 finishes the processing to the built-in memory device 103 in step S2021, the bus right controller 141 sends the WiGig device 105 a control signal for host right transfer (resumption command).

In step S2023, when the WiGig device 105 receives the control signal for host right transfer (resumption command), the remote access reception controller 140 sends the peripheral device 201 a remote access permission signal so that control signals and data to and from the peripheral device 201 can be sent and received. The peripheral device 201 resumes the paused data transfer upon receiving the remote access permission signal. At this point, the peripheral device 201 can resume from the place where the data transfer was interrupted, so there is no need to restart from reading the FS management information (that is, there is no need to create a mounted state). Therefore, there is no need to produce and send information about mismatching elimination by the FS mismatching processor 226 as in Embodiment 1 (FIG. 3). Also, with the host device 101, there is no need to process the information about FD mismatching elimination with the remote access reception controller 140.

In step S2024, a control signal indicating remote access completion, which notifies that the processing of the FS mismatching processor 226 has been completed, is sent to the host device 101.

In step S2025, a control signal for remote access completion is received via the WiGig device 105, and the remote access reception controller 140 sends a control signal for host right release, by which the host right is released to the device controller 107. Upon receiving this control signal for host right release, the device controller 107 notifies the CPU 131 that processing to interrupt the transfer of data has been completed, and thereafter the built-in memory device 103 can be accessed from the CPU 131.

2.2. Features of Embodiment 2

In the above embodiment, when the transfer of data is interrupted and mismatching occurs in the management information of the file system, the host device 101 sends a pause command to the peripheral device 201, and after the device controller 107 performs specific processing on the built-in memory device 103 by means of the released host right, the host right is again returned to the WiGig device 105, and data transfer to the peripheral device 201 is resumed. Consequently, the host device 101 does not have to start over from the initial processing, such as reading the FS management information, in order to eliminate file system mismatching with the peripheral device 102. Thus, the interrupted state of data transfer can be eliminated faster.

2.3. Modification Example of Embodiment 2

In the above embodiment, the device controller 107 issues a pause command along with a host right release request (S2015), but there is no need to issue a pause command from the outset. For example, the device controller 107 may send a specific control signal (not limited to a pause command or interrupt command) along with a host right release request, confirm the state of data transfer via the WiGig device 105, and then produce either a pause command or an interrupt command, and send it to the WiGig device 105.

3. Other Embodiments

The blocks in the communication system, host device, and peripheral device described in the above embodiment may individually be made into chips by using an LSI or other such semiconductor device, or may be made into a chip including all or part of these.

The term "LSI" was used here, but depending on the degree of integration, this is also called IC, system LSI, super LSI, and ultra LSI.

The method for creating an integrated circuit will not limited to LSI, and may instead involve the use of a dedicated circuit or a multipurpose processor. After LSI manufacture, a reconfigurable processor that allows the reconfiguration of settings or connections of the circuit cells within the LSI, or a FPGA (field programmable gate array) that allows programming, may be utilized.

Furthermore, should some technology for circuit integration appear that takes the place of LSI through the advance of semiconductor technology or another derivative technology, that technology may of course be used to integrate the functional blocks. The application of biotechnology and the like is another possibility.

Also, all or part of the processing of the various functional blocks in the above embodiment may be accomplished by a program. All or part of the processing of the various functional blocks in the above embodiment may also be performed by the central processing unit (CPU) of a computer. Programs used for performing this processing may be stored on a hard disk, a ROM, or another such memory device, and are executed by being read from a ROM or RAM.

The processing in the above embodiment may be accomplished by hardware, or by software (including when it is accomplished along with an operating system (OS), middleware, or a specific library). Furthermore, it may be accomplished by a combination of processing by software and hardware. If the communication system, host device, and peripheral device pertaining to the above embodiment is constituted by hardware, it should go without saying that the timing will need to be adjusted for performing the various processing. In the above embodiment, details about adjusting the timing of the various signals, which occurs in actual hardware design, is not discussed in detail so as to simplify the description.

Also, the execution order in the processing method in the above embodiment is not necessarily limited to what is given in the above embodiment, and the execution order can be changed without departing from the gist of the invention.

A computer program by which the above-mentioned method is executed on a computer, and a recording medium that can be read by the computer on which this program has been recorded are included in the scope of the present invention. Examples of recording media that can be read by a computer include a flexible disk, hard disk, CD-ROM, MO, DVD, DVD-ROM, DVD-RAM, BD (Blu-ray Disc), and semiconductor memory.

The above-mentioned computer program is not limited to one that is recorded to the above-mentioned recording medium, and may instead be one that is transmitted via an electrical communication circuit, a wireless or wired communication circuit, a network (such as the Internet), or the like.

Also, in the above embodiment, the host device and the peripheral device were described as separate devices, but this is not the only option, and the host device and peripheral device may instead be configured as a single device. Also, "host device" is a concept that includes an access module (host module), and "peripheral device" is a concept that includes a peripheral device module.

The present invention is not, of course, limited to or by the above embodiment, and modifications are possible without departing from the gist of the invention. The numerical values used in this embodiment are just examples, and other numerical values may be used instead.

What is claimed is:

1. An access device provided in a host device and configured to control reading or writing of data from or to a memory, in a communication system including a data recording device and the host device that are wirelessly connected to each other, the access device comprising:
   the memory configured to store data; and
   a device controller configured to send and receive a data control right between the data recording device and a central controller provided in the host device, the data control right being an exclusive right to execute the reading or the writing of data that is managed by a file system provided in the memory;
   wherein the device controller is configured to:
   when having received a request to interrupt transfer of data from the central controller provided in the host device while data is being transferred from the data recording device after the data control right has been granted to the data recording device, release the data control right from the data recording device, and have the data recording device determine whether or not mismatching has occurred in file system management information for data stored in the memory; and
   return the data control right to the data recoding device when it is determined that mismatching has occurred in the file system management information, and
   the data recording device is configured to:
   release the data control right after eliminating the mismatching in the file system management information according to the returned data control right.

2. The access device according to claim 1,
   wherein the device controller is configured to:
   when it is determined that mismatching has occurred in the file system management information and the data control right is returned to the data recording device, produce a command signal for eliminating the mismatching in the file system management information and send the command signal to the data recording device.

3. The access device according to claim 1,
wherein the device controller is configured to request the data recording device to release the data control right upon receiving the request to interrupt the transfer of data from the central controller, produce a command signal for interrupting the transfer of data from the data recording device, and send the command signal to the data recording device.

4. The access device according to claim 1,
wherein the device controller is configured to request the data recording device to release the data control right upon receiving the request to interrupt the transfer of data from the central controller, produce a command signal for pausing the transfer of data from the data recording device, and send the command signal to the data recording device.

5. The access device according to claim 4,
wherein, the device controller is configured to, when it is determined that mismatching has occurred in the file system management information, return the data control right to the data recording device, produce a command signal for resuming the transfer of data, and send the command signal to the data recording device.

6. The access device according to claim 4,
wherein the device controller is configured to execute specific processing on the memory according to a command from the central processor while the data recording device is pausing the transfer of data, and
the specific processing is at least one of the reading of data from the memory and writing to an address that is unrelated to the transfer of data from the data recording device.

7. The access device according to claim 1,
wherein the device controller is configured to produce either a command signal for interrupting the transfer of data or a command signal for pausing the transfer of data upon receiving the request to interrupt the transfer of data from the central processor, depending on a state of the transfer of data from the data recording device, and send the command signal to the data recording device.

8. An access device provided in a host device and configured to control reading or writing of data from or to a memory, in a communication system including a data recording device and the host device that are wirelessly connected to each other, the access device comprising:
the memory configured to store data; and
a device controller configured to send and receive a data control right between the data recording device and a central controller provided in the host device, the data control right being an exclusive right to execute the reading or the writing of data that is managed by a file system provided in the memory;
wherein the device controller is configured to:
when having received a request to interrupt transfer of data from the central controller provided in the host device while data is being transferred from the data recording device after the data control right has been granted to the data recording device, produce a command signal for having the data recording device interrupt the transfer of data and send the command signal to the data recording device, and
the data recording device is configured to release the data control right after eliminating mismatching in file system management information for data stored in the memory when having received the command signal for having the data recording device interrupt the transfer of data from the central controller provided in the host device.

9. A communication device, comprising:
an access device provided in a host device and configured to control reading or writing of data from or to a memory, the access device including the memory configured to store data and a device controller configured to send and receive a data control right between a data recording device wirelessly connectable to the access device and a central controller provided in the host device, the data control right being an exclusive right to execute the reading or the writing of data that is managed by a file system provided in the memory;
the central controller;
a display component configured to display a result of processing by the central controller; and
a manipulation component configured to be manipulated by the user,
wherein the device controller is configured to:
when having received a request to interrupt transfer of data from the central controller provided in the host device while data is being transferred from the data recording device after the data control right has been granted to the data recording device, release the data control right from the data recording device, and have the data recording device determine whether or not mismatching has occurred in file system management information for data stored in the memory; and
return the data control right to the data recoding device when it is determined that mismatching has occurred in the file system management information, and
the data recording device is configured to:
release the data control right after eliminating the mismatching in the file system management information according to the returned data control right, and
wherein the central controller is configured to, when the data recording device is holding the data control right, send the device controller of the access device the request to interrupt the transfer of data from the data recording device according to user manipulation, acquire the data control right from the device controller, and write or read data to the memory.

10. A communication system comprising:
an access device provided in a host device and configured to control reading or writing of data from or to a memory, the access device including the memory configured to store data and a device controller configured to send and receive a data control right between a data recording device wirelessly connectable to the access device and a central controller provided in the host device, the data control right being an exclusive right to execute the reading or the writing of data that is managed by a file system provided in the memory; and
the data recording device,
wherein the device controller is configured to:
when having received a request to interrupt transfer of data from the central controller provided in the host device while data is being transferred from the data recording device after the data control right has been granted to the data recording device, release the data control right from the data recording device, and have the data recording device determine whether or not mismatching has occurred in file system management information for data stored in the memory; and return the data control right to the data recoding device when it is determined that mismatching has occurred in the file system management information, and
the data recording device is configured to:
release the data control right after eliminating the mismatching in the file system management information according to the returned data control right, and
wherein the data recording device includes:
a data storage component configured to store data; and
a data transfer controller configured to control transfer of data stored in the data storage component,
the data transfer controller is configured to:
acquire from the access device the file system management information for the file system provided in the memory in the access device,
transfer the data stored in the data storage component to the access device on the basis of the file system management information, the stored data being recorded in a file created on the memory,
interrupt the transfer of data upon receiving from the access device the request to interrupt the transfer of data while transferring the data to the access device, and
determine whether or not there is mismatching in the file system management information after interrupting the transfer of data, and send a result of the determination to the access device.

11. A communication system comprising:
an access device provided in a host device and configured to control reading or writing of data from or to a memory, the access device including the memory configured to store data and a device controller configured to send and receive a data control right between a data recording device wirelessly connectable to the access device and a central controller provided in the host device, the data control right being an exclusive right to execute the reading or the writing of data that is managed by a file system provided in the memory; and
the data recording device,
wherein the device controller is configured to:
when having received a request to interrupt transfer of data from the central controller provided in the host device while data is being transferred from the data recording device after the data control right has been granted to the data recording device, release the data control right from the data recording device, and have the data recording device determine whether or not mismatching has occurred in file system management information for data stored in the memory; and
return the data control right to the data recoding device when it is determined that mismatching has occurred in the file system management information, and
the data recording device is configured to:
release the data control right after eliminating the mismatching in the file system management information according to the returned data control right, and
wherein the data recording device includes:
a data storage component configured to store data; and
a data transfer controller configured to control the transfer of data stored in the data storage component,
the data transfer controller is configured to:
acquire from the access device the file system management information for the file system provided in the memory in the access device;
transfer the data stored in the data storage component to the access device on the basis of the file system management information, the stored data being recorded in a file created on the memory;

determine whether or not there is mismatching in the file system management information upon receiving from the access device the request to interrupt the transfer of data while transferring the data to the access device; and
send information for eliminating the mismatching in the file system management information to the access device when determining that there is mismatching in the file system management information.

12. A data access method using an access device provided in a host device and configured to control reading or writing of data from or to a memory, in a communication system including a data recording device and the host device that are wirelessly connected to each other, the access device including the memory configured to store data, and a device controller configured to send and receive a data control right between the data recording device and a central controller provided in the host device, the data control right being an exclusive right to execute the reading or the writing of data that is managed by a file system provided in the memory, the data access method includes:
receiving a request to interrupt the transfer of data from the central controller while data is being transferred from the data recording device to the memory in the access device;
releasing the data control right from the data recording device;
determining, via the device controller, whether or not mismatching has occurred in file system management information for data stored in the memory, on the basis of information received from he data recoding device;
returning the data control right to the data recording device when determining, via the device controller, that mismatching has occurred in the file system management information;
eliminating, via the data recording device, the mismatching in the file system management information according to the returned data control right; and
releasing the data control right from the data recording device.

13. The data access method according to claim 12, further including:
using the data recording device wirelessly connectable to the access device,
acquiring from the access device the file system management information for the file system provided in the memory in the access device;
transferring the data stored in the data recording device to the access device on the basis of the file system management information, the stored data being recorded in a file created on the memory;
interrupting the transfer of data upon receiving the request to interrupt the transfer of data from the access device while transferring the data to the access device;
determining whether or not there is mismatching in the file system management information after interrupting the transfer of data; and
sending a result of the determination to the access device.

14. A data access method using an access device provided in a host device and configured to control reading or writing of data from or to a memory, in a communication system including a data recording device and the host device that are wirelessly connected to each other, the access device including the memory configured to store data, and a device controller configured to send and receive a data control right between the data recording device and a central controller provided in the host device, the data control right being an exclusive right to execute the reading or the writing of data that is managed by a file system provided in the memory, the data access method includes:
- after the data control right is granted to the data recording device by the device controller, receiving a request to interrupt the transfer of data from the central controller provided in the host device while data is being transferred from the data recording device;
- requesting, via the device controller, the data recording device to release the data control right;
- producing, via the device controller, a command signal for interrupting the transfer of data, and sending the command signal to the data recording device;
- eliminating, via the data recording device, mismatching in file system management information for data stored in the memory; and
- releasing the data control right from the data recording device.

15. The data access method according to claim 14, further including:
- using the data recording device wirelessly connectable to the access device,
- acquiring from the access device the file system management information for the file system provided in the memory in the access device;
- transferring the data stored in the data recording device to the access device on the basis of the file system management information, the stored data being recorded in a file created on the memory;
- determining whether or not there is mismatching in the file system management information upon receiving the request to interrupt the transfer of data from the access device while transferring the data to the access device; and
- sending information for eliminating the mismatching in the file system management information to the access device when determining that there is mismatching in the file system management information.

* * * * *